United States Patent
Press et al.

(10) Patent No.: US 8,088,695 B1
(45) Date of Patent: Jan. 3, 2012

(54) FABRIC MATERIAL AND PROCESS FOR PREPARING SAME

(76) Inventors: Stuart Press, Guilford, CT (US); Harold Hoder, Woodbridge, CT (US)

( * ) Notice: Subject to any disclaimer, the term of this patent is extended or adjusted under 35 U.S.C. 154(b) by 1832 days.

(21) Appl. No.: 10/309,360

(22) Filed: Dec. 3, 2002

Related U.S. Application Data

(60) Provisional application No. 60/338,197, filed on Dec. 3, 2001.

(51) Int. Cl.
*B32B 27/04* (2006.01)

(52) U.S. Cl. ............ 442/104; 428/34.1; 280/728.1

(58) Field of Classification Search .......... 428/34.1, 428/34.3, 35.7, 35.9, 36.1, 36.2, 36.91, 36.92; 442/59, 103, 104, 286, 394; 383/3; 280/728.1, 280/730.1, 730.2
See application file for complete search history.

(56) References Cited

U.S. PATENT DOCUMENTS

| | | | | |
|---|---|---|---|---|
| 5,073,418 A | * | 12/1991 | Thornton et al. | 428/34.9 |
| 6,177,366 B1 | * | 1/2001 | Li | 442/71 |
| 6,294,487 B1 | * | 9/2001 | Keshavaraj | 442/218 |
| 6,306,989 B1 | * | 10/2001 | Bloom et al. | 526/200 |
| 6,451,715 B2 | * | 9/2002 | Li et al. | 442/76 |
| 6,701,971 B1 | * | 3/2004 | Sollars et al. | 139/387 R |
| 2003/0008585 A1 | * | 1/2003 | Rubin et al. | 442/286 |
| 2003/0027474 A1 | * | 2/2003 | Hayes | 442/149 |
| 2003/0040238 A1 | * | 2/2003 | Li | 442/76 |
| 2004/0018787 A1 | * | 1/2004 | Bullock et al. | 442/59 |

\* cited by examiner

*Primary Examiner* — Arti Singh-Pandey
(74) *Attorney, Agent, or Firm* — Bachman & LaPointe, P.C.

(57) ABSTRACT

A laminated fabric material includes a fabric material and a substantially gas impermeable film laminated to the fabric material, the film having an inner, fabric-facing surface and an outer surface, wherein the outer surface includes a fluoropolymer treated surface.

5 Claims, 1 Drawing Sheet

FABRIC MATERIAL AND PROCESS FOR PREPARING SAME

PRIORITY CLAIM TO PROVISIONAL APPLICATION

This application claims priority to provisional application No. 60/338,197, filed Dec. 3, 2001.

BACKGROUND OF THE INVENTION

The invention relates to a fabric material and, more particularly, to a fabric material which is well suited for use in manufacturing inflatable restraint systems, particularly side curtain safety devices for automobiles and the like.

Side curtain safety devices deploy, for example, when the vehicle in which they are located is subjected to roll-over type impact. A typical roll-over event can last for an extended period of time, and can be extremely dangerous to persons within the vehicle. Side curtains are helpful in enhancing safety of individuals in the vehicle. However, unlike conventional front-impact airbags, side curtains need a substantial degree of air impermeability so that they can stay inflated during an entire roll-over event.

Although efforts have been made to provide substantially impermeable fabrics for use in such devices, these efforts typically lead to other problems, for example, to fabrics which do not properly deploy when needed due to material instability when subjected to accelerated aging tests which are intended to simulate typical long-term storage at expected conditions. Further, lamination of impermeable films which have anti-blocking properties is also plagued with difficulties in delamination of the film from the bag material or fabric, particularly at stitches of the bag.

It is clear that the need remains for a substantially gas impermeable fabric which can suitably be used in side curtain safety devices, and which withstands the conditions of storage and shock during deployment which is typical and expected in a side curtain or other supplemental restraint system within a vehicle.

It is therefore the primary object of the present invention to provide such a material.

It is a further object of the present invention to provide a process for making such material.

Other objects and advantages of the present invention appear hereinbelow.

SUMMARY OF THE INVENTION

In accordance with the present invention, the foregoing objects and advantages have been readily attained.

According to the invention, a fabric is provided which includes a fabric member which is typically a woven fabric stitched together or otherwise secured together so as to provide the desired airbag or side curtain shape. Laminated to the fabric is a substantially gas impermeable film, preferably polyurethane, which has an outer surface, wherein the outer surface is fluoropolymer-treated so as to have anti-blocking properties, whereby the material does not "block" or adhere to itself during storage, for example within a storage compartment in an automobile.

In further accordance with the present invention, a process for making such a material is disclosed, which includes the steps of providing a fabric material, laminating a urethane film to at least one side of the fabric, and treating an outer surface of the film with a fluoropolymer solution comprising a fluoropolymer and a solvent so as to provide the film with a fluoropolymer-treated outer surface that is resistant to blocking as desired.

In accordance with the present invention, the fluoropolymer solution preferably comprises fluoropolymer such as ZONYL™ 807 or ZONYL™ 704 provided by Ciba-Geigy Corporation of Greensboro, N.C., although other fluoropolymer materials are acceptable. A preferred solvent is polyurethane effective such as tetrahydrofuran (THF), although others are suitable. The fluoropolymer solution may further comprise melamine formaldehyde condensate or solutions, such as methylated melamine-formaldehyde resin solution, one example of which is Resimene™ provided by Solutia, Inc., or Freerez MW™ resin provided by BF Goodrich, typically with corresponding solvents or catalysts such as ethyl acid phosphate, accelerators such as FreeCat™ as provided by Noveon, Inc., additional solvent, such as N-methylpyrrolidine, antifoam agents such as Antifoam™ Y-30 emulsion provided by Dow Corning Corporation, and surfactant such as, for example, Alkanol™ 6112 surfactant provided by DuPont Chemicals.

This solution is applied to the film so as to be able to incorporate into or otherwise interact the fluoropolymer with the film on curing to result in a fluoropolymer treated surface with anti-blocking properties.

BRIEF DESCRIPTION OF THE DRAWINGS

A detailed description of preferred embodiments of the invention follows, with reference to the attached drawings, wherein.

DETAILED DESCRIPTION

The invention relates to a fabric material and process for making same, and particularly to a fabric which is ideally suited for use in airbags and especially in side curtains where gas impermeability is critical so as to maintain inflation or deployment for a sufficient amount of time.

Fabric for use in inflatable safety mechanisms are prepared so as to have sufficient mechanical strength for the desired use. In some instances, gas impermeability, or at least substantial gas impermeability, are necessary to allow for sustained inflation. Gas impermeable films can be laminated to such fabric to accomplish the desired impermeability. However, films which are impermeable and which survive aging testing and the like tend to "block" when stored in expected conditions or when subjected to the aforesaid accelerated aging testing, or for example when folded upon itself in a vehicle storage compartment and subjected to various conditions including high temperatures and the like.

In accordance with the present invention, a laminated fabric and method for preparing same are provided wherein the fabric is gas impermeable due to a urethane or polyurethane film laminated to the base fabric and the film is treated so as to provide outside surfaces of the film with anti-blocking properties.

Figure 1:
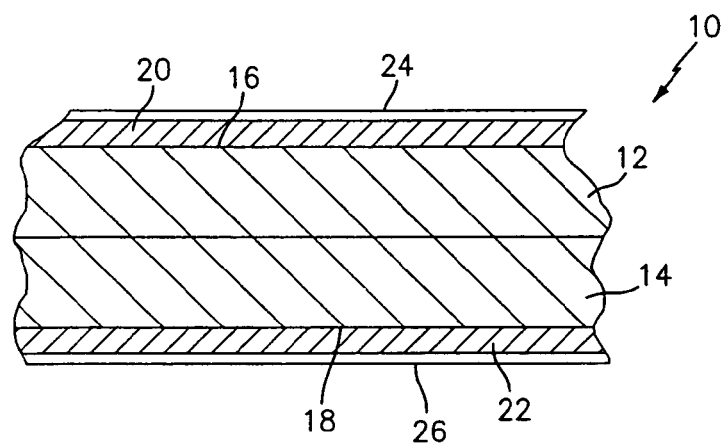
FIG. 1 schematically illustrates a fabric in accordance with the present invention.

FIG. 1 schematically shows a portion of the fabric material in accordance with the present invention. This material is generally referred to by reference numeral 10.

Material 10 typically includes a base fabric 12 which may typically be a woven, non-woven or otherwise-prepared fabric material typically selected for sufficient mechanical strength for the desired application. Two layers 12, 14 of fabric may typically be provided, as shown in FIG. 1, as typical airbags and side curtains are prepared by stitching two different layers of the same material together. In such articles, the stitches are deployed around a perimeter of the device such that, upon inflation, the layers 12, 14 of material separate and inflate to the desired shape.

In accordance with the present invention, fabric 12, 14 is provided such that outer surfaces 16, 18 have laminated thereto a substantially gas impermeable film 20, 22, for example a urethane or polyurethane film. Film 20, 22 is laminated to fabric 12, 14 using any method known to one of ordinary skill in the art, so long as the curing process or other mechanism used to laminate the film results in a sufficient lamination of film that the film does not delaminate when subjected to expected stresses during use.

One example of a suitable lamination method for reliably placing film 20, 22 on fabric 12, 14 is as described in U.S. Pat. No. 5,709,766 to Press et al.

Lamination as described above results in a gas impermeable fabric wherein the film is adhered to the material as desired.

At this stage, the fabric would be sufficiently gas impermeable and sufficiently laminated together that the fabric could be used for an airbag or side curtain device. However, the storage conditions to which such devices are subjected prior to their use would typically result in blocking of the urethane or polyurethane material to itself, which would interfere with appropriate deployment of the device when needed, for example by preventing inflation due to adhered adjacent layers of urethane, or by ripping the urethane from the fabric when the device deploys.

In accordance with the present invention, it has been found that outer surfaces of the urethane or polyurethane material can be treated with a fluoropolymer solution such that the films are provided with an outer surface 24, 26 which has excellent anti-block properties and which therefore can be stored in typical conditions for airbags or side curtain without risk of blocking or other difficulties in deployment of the device.

In accordance with the present invention, treated surfaces 22, 24 are treated with a fluoropolymer solution which will be further described below so as to deposit and/or incorporate into a surface portion of film 20, 22, at least a portion or remnant of the fluoropolymer material which provides and produces the desired anti-blocking properties. Fabric provided and laminated in accordance with the present invention, with fluoropolymer treated surfaces, performs well when subjected to conventional blocking tests, for example wherein a known area of material is provided, and force applied to produce a pressure between adjacent layers of material of about 5 psi. The material is then subjected to a temperature of 105° C. for a period of at least 7 days. Following this test, the layers of the material in accordance with the present invention readily separate as called for by conventional test methods.

Figure 2:
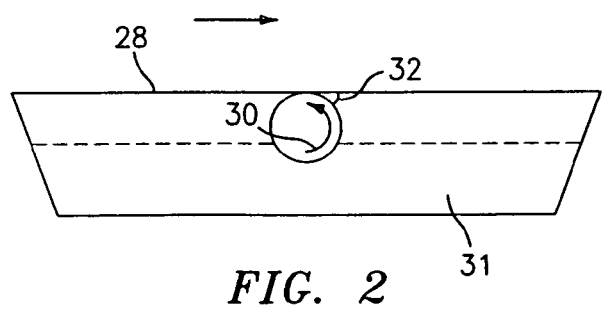
FIG. 2 schematically illustrates a process in accordance with the present invention.

Turning to FIG. 2, a portion of the process for forming the fabric in accordance with the present invention is further illustrated. In FIG. 2, material 28 is schematically illustrated being fed to a roller 30 wherein a thin coating or portion of fluoropolymer solution 31 is applied to material 28 which, upon curing, provides the desired fluoropolymer treated surface. Roller 30 is preferably adapted and operated so as to form a thin meniscus at a point where the film of material 28 meets roller 30, which advantageously applies a sufficient and substantially uniform amount of desired material to outer surfaces of the film. This may be accomplished, for example, by positioning roller 30 in a bath of solution 31 as shown, and rotating roller 30 counterclockwise as shown in FIG. 2 such that adjacent surface of roller 30 is moving in an opposite direction to film 28 so as to form meniscus 32 as desired. Of course, other structures and methods can readily be used to apply solution to the film as desired.

The solution-coated material is then cured to provide the desired end product which has, as described above, excellent anti-blocking properties as well as other properties which make the material suitable for use in side curtain safety devices.

In accordance with the present invention, and as described above, the solution which has been found in accordance with the present invention to provide for excellent anti-blocking properties is a fluoropolymer solution, more preferably a solution of fluoropolymer in solvent, and it is believed that the solvent portion of the fluoropolymer solution acts upon outer surfaces of the film to allow the fluoropolymer to incorporate into outer surfaces 24, 26 as desired such that curing provides the desired resulting anti-blocking surface.

In accordance with the present invention, fluoropolymer materials which have been found to provide excellent results include proprietary fluoropolymer materials provided under the trade name Zonyl™ 8070 and Zonyl™ 7040 by Ciba-Geigy Corporation, although other fluoropolymers would be suitable.

A suitable solvent is any solvent which is effective on urethane and polyurethane films and compatible with the fluoropolymer so as to provide for the desired interaction between the urethane film and the fluoropolymer material. One excellent solvent for use in accordance with the present invention is tetrahydrofuran (THF), although others are suitable.

In accordance with the present invention, additional components may be incorporated into the solution, if desired. For example, melamine formaldehyde compositions can be incorporated into the solution for enhancing the anti-block properties of the resulting film surface. Examples of such compositions include melamine-formaldehyde resin solutions such as Resimene 730® provided by Solutia, Inc., and melamine-formaldehyde condensate resins such as Freerez® as provided by Noveon, Inc. In each case, such materials may advantageously be provided with a particular solvent or accelerator to enhance the operation of this material when applied to polyurethane film. For example, ethyl acid phosphate is one catalyst that can advantageously be combined with melamine-formaldehyde resins to enhance action between the melamine-formaldehyde resin solution and polyurethane material. Another example of a suitable accelerator is FreeCat™ provided by Freedom Textile Chemicals Company, although other accelerators will be known and readily available to a person of ordinary skill in the art.

Another solvent which may suitably be incorporated into the solution, if desired, is N-methyl pyrrolidine, or MPY-ROL, which may be desirable in small amounts for enhancing interaction between the fluoropolymer and urethane materials.

Depending upon the components used, it may also be desirable to incorporate an anti-foam agent into the solution, and one example of a suitable anti-foam agent is Antifoam Y-30 emulsion, provided by Dow Corning Corporation. Also depending upon the components used in solution, a surfactant may be desirable such as, for example, Alkanol 6112 surfactant provided by DuPont Chemicals.

The various ingredients to be used in solution can be prepared as follows.

The solvents to be used should be measured into a suitable vessel or drum. Separately, the fluoropolymer material should be provided in solution, typically in an aqueous solution as in the case of Zonyl™ 8070, or in solution with a solvent as in the case of Zonyl™ 7040, and be mixed with any accelerators to be used. The fluoropolymer solution is then mixed with the solvents and any additional solvents to be used can then be added to the solution as well.

Melamine formaldehyde compositions, if they are to be used, can then be added, typically along with any desired compatible accelerators, anti-foam agents and surfactants.

With sufficient mixing, the solution is now ready to be applied, for example by using a spinning roller as schematically illustrated in FIG. 2 and as described above.

The various ingredients to be incorporated into the solution may advantageously be incorporated in amounts as shown in Table 1 below:

TABLE 1

| Component | Percent Weight |
| --- | --- |
| Solvent | 40 lbs. |
| Fluoropolymer | 0.8-8 lbs. |
| Accelerator | 0-20- gr |
| Melamine-formaldehyde Condensate | 0-100 gr |
| Surfactant | 0-40 gr |
| Anti-foam Agent | 0-500 gr |
| Catalyst | 0-375 gr |
| Melamine-formaldehyde Resin Solution | 0-8 lbs. |

The amounts presented in Table 1 above are based upon a 40 lbs. starting amount of solvent. This starting solvent may be a blend of solvents, for example a blend of THF and MPYROL, and the THF and MPYROL may advantageously be provided at ratios of 80-98% wt. THF and 2-20% wt. MPYROL. The remaining amounts presented in Table 1 are based upon suitable amounts in accordance with the present invention based upon the 40 lbs. solvent.

One particular example of a solution according to the embodiment of Table 1 which provides excellent results in accordance with the present invention is as described in Table 2.

TABLE 2

| Component | Amount |
| --- | --- |
| THF | 36 lbs. |
| MPYROL | 4 lbs. |
| Fluoropolymer (Zonyl™ 8070) | 3.5 lbs. |
| Accelerator (FreeCat™) | 11 gr. |
| Melamine-formaldehyde Condensate (Freerez™ MW) | 79 gr. |
| Surfactant (Alkanol™ 6112) | 25 gr. |
| Anti-foam Agent | 65 gr. |
| Ethyl Acid Phosphate | 18 gr. |
| Melamine-formaldehyde Resin Solution (Resimene™ 730) | 4.5 lbs. |

As set forth above, the particularly critical ingredients in accordance with the preferred embodiment of the present invention are the fluoropolymer composition and associated solvent. The additional materials included in accordance with the preferred solution as described above serve to further enhance the action of fluoropolymer with urethane materials so as to provide the desired anti-blocking treated surface on same.

As an alternative embodiment, it has been found that the urethane or polyurethane film can be treated using a melamine-formaldehyde solution to treat the film, for example using Resimine and a suitable catalyst, in this case ethyl acid phosphate. When cross-linked or thermo-set, this treatment also provided a urethane-coated material wherein outer surfaces of the urethane were fluoropolymer treated to provide anti-block properties.

It should be noted that the present invention as described above provides for an excellent material which is well-suited for use in side curtain devices and the like as desired, and which solves the aforementioned problems in the industry. The resulting product has excellent flexibility, while also surviving accelerated aging tests and deployment tests, and is provided using practical and reasonably available materials.

Following application of the solution, the coated material with film is cured at effective conditions so as to result in the desired surfaces.

For a typical side curtain devices, the non-coated fabric is stitched together to form a flat article that can be inflated to the desired shape. Urethane film is then laminated to top and bottom surfaces, and cured, for example as described in the above mentioned patent to Press et al. The fluoropolymer solution is then applied and cured, either to both top and bottom films simultaneously or sequentially, depending upon the equipment available, to produce the desired final article.

In accordance with the present invention, it should be readily apparent that a fabric or material, and a process for preparing same, have been provided which are extremely well suited for use in fabrication of airbags and, most particularly, side curtains where the fabric must be substantially gas impermeable, the gas impermeable layer must be well-laminated to the fabric, and the gas impermeable layer must have anti-blocking properties.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A laminated fabric material, comprising:
   a fabric material; and
   a substantially gas impermeable film laminated to the fabric material, the film having an inner, fabric-facing surface and an outer surface, wherein said outer surface comprises a fluoropolymer treated surface.

2. The material of claim 1, wherein said outer surface has anti-block properties.

3. An inflatable restraint device formed of a laminated fabric material, wherein the laminated fabric material comprises:
   a fabric material; and
   a substantially gas impermeable film laminated to the fabric material, the film having an inner, fabric-facing surface and an outer surface, wherein said outer surface comprises a fluoropolymer treated surface.

4. The device of claim 3, wherein the fluoropolymer treated surface includes a deposited layer of at least a portion or remnant of a fluoropolymer material.

5. The device of claim 3, wherein the fluoropolymer treated surface has, incorporated into the surface, at least a portion or remnant of a fluoropolymer material.

* * * * *